US012202710B2

(12) United States Patent
Oshima

(10) Patent No.: US 12,202,710 B2
(45) Date of Patent: Jan. 21, 2025

(54) CRANE

(71) Applicant: TADANO LTD., Kagawa (JP)

(72) Inventor: Masanori Oshima, Kagawa (JP)

(73) Assignee: TADANO LTD., Kagawa (JP)

( * ) Notice: Subject to any disclaimer, the term of this patent is extended or adjusted under 35 U.S.C. 154(b) by 195 days.

(21) Appl. No.: 17/792,923

(22) PCT Filed: Feb. 17, 2021

(86) PCT No.: PCT/JP2021/005977

§ 371 (c)(1),
(2) Date: Jul. 14, 2022

(87) PCT Pub. No.: WO2021/166970

PCT Pub. Date: Aug. 26, 2021

(65) Prior Publication Data

US 2023/0065923 A1 Mar. 2, 2023

(30) Foreign Application Priority Data

Feb. 18, 2020 (JP) ................................ 2020-025070

(51) Int. Cl.
*B66C 23/76* (2006.01)

(52) U.S. Cl.
CPC .................................... *B66C 23/76* (2013.01)

(58) Field of Classification Search
CPC . B66C 23/72; B66C 23/74; E02F 9/18; B62D 49/085
See application file for complete search history.

(56) References Cited

U.S. PATENT DOCUMENTS 3,726,417 A * 4/1973 Nephew .................. B66C 13/18 212/288
10,124,994 B2 11/2018 Torghele
10,189,683 B2 * 1/2019 Bitz ........................ B66C 23/76
11,440,778 B2 * 9/2022 Oshima ................... B66C 23/76
2016/0185576 A1 * 6/2016 Bitz ........................ B66C 23/76 212/197

(Continued)

FOREIGN PATENT DOCUMENTS

JP S59-167872 U 11/1984
JP 2016-137998 A 8/2016

(Continued)

OTHER PUBLICATIONS

JP 2019196239A Machine Translation (Year: 2019).*

(Continued)

*Primary Examiner* — Michael R Mansen
*Assistant Examiner* — Juan J Campos, Jr.
(74) *Attorney, Agent, or Firm* — Paratus Law Group, PLLC

(57) ABSTRACT

This crane is provided with a counterweight which includes an engaging part, a swivel body which is configured to be capable of swiveling, and a fixing unit which is provided on the swivel body, includes an engaged part that can connect with the engaging part, and can adopt a front position and a rear position; in each of the front position and the rear position, the fixing unit and the counterweight are linked by the engaged part being arranged in a position corresponding to that of the engaging part and being connected to the engaging part.

18 Claims, 6 Drawing Sheets

(56) References Cited

U.S. PATENT DOCUMENTS

2021/0300734 A1* 9/2021 Oshima .................. B66C 23/76

FOREIGN PATENT DOCUMENTS

| | | | |
|---|---|---|---|
| JP | 2019196239 A | * | 11/2019 |
| WO | WO 2020/031842 A1 | | 2/2020 |

OTHER PUBLICATIONS

Apr. 20, 2021, International Search Report issued for related PCT Application No. PCT/JP2021/005977.
Apr. 20, 2021, International Search Opinion issued for related PCT Application No. PCT/JP2021/005977.

* cited by examiner

CRANE

CROSS REFERENCE TO PRIOR APPLICATION

This application is a National Stage Patent Application of PCT International Patent Application No. PCT/JP2021/005977 (filed on Feb. 17, 2021) under 35 U.S.C. § 371, which claims priority to Japanese Patent Application No. 2020-025070 (filed on Feb. 18, 2020), which are all hereby incorporated by reference in their entirety.

TECHNICAL FIELD

The present invention relates to a crane mounted with a counterweight.

BACKGROUND ART

Conventionally, it is known that a counterweight is mounted on a rear part of a swivel body of a crane (See, for example, Patent Literature 1).

Patent Literature 1 discloses a configuration in which left and right ballast towers are pivotally rotatable toward a rear part. This causes the center of gravity of the entire ballast plate to be changed with respect to the crane, and the stability of the crane to be improved.

CITATION LIST

Patent Literature

Patent Literature 1: JP 2016-137998 A

SUMMARY OF THE INVENTION

Problems to be Solved by the Invention

However, the invention disclosed in Patent Literature 1 has a configuration in which the carrier arms provided on the left and right of the upper structure of the crane pivotally rotates about the vertical axis via a finger-type fork joint, and there is a possibility that the configuration becomes complicate.

Therefore, an object of the present invention is to provide a crane capable of changing a fixing position of a counterweight front and rear with a simple configuration.

Solutions to Problems

One aspect of a crane according to the present invention includes:

- a counterweight including an engaging part;
- a swivel body that is configured to be capable of swiveling; and
- a fixing unit that is provided on the swivel body, includes an engaged part that can connect with the engaging part, and can adopt a front position and a rear position, in which
- in each of the front position and the rear position, the fixing unit and the counterweight are linked by the engaged part being arranged in a position corresponding to that of the engaging part and being connected to the engaging part.

Effects of the Invention

According to the present invention, it is possible to provide a crane capable of changing a fixing position of a counterweight front and rear with a simple configuration.

DESCRIPTION OF EMBODIMENTS

Hereinafter, an embodiment of a crane according to the present invention will be described with reference to the drawings.

Embodiment

The crane according to the present embodiment is a rough terrain crane (hereinafter, simply referred to as crane), which is a mobile crane. The crane according to the present invention is not limited to a mobile crane, and may be various cranes that can be mounted with a counterweight.

(Crane)

Figure 1:
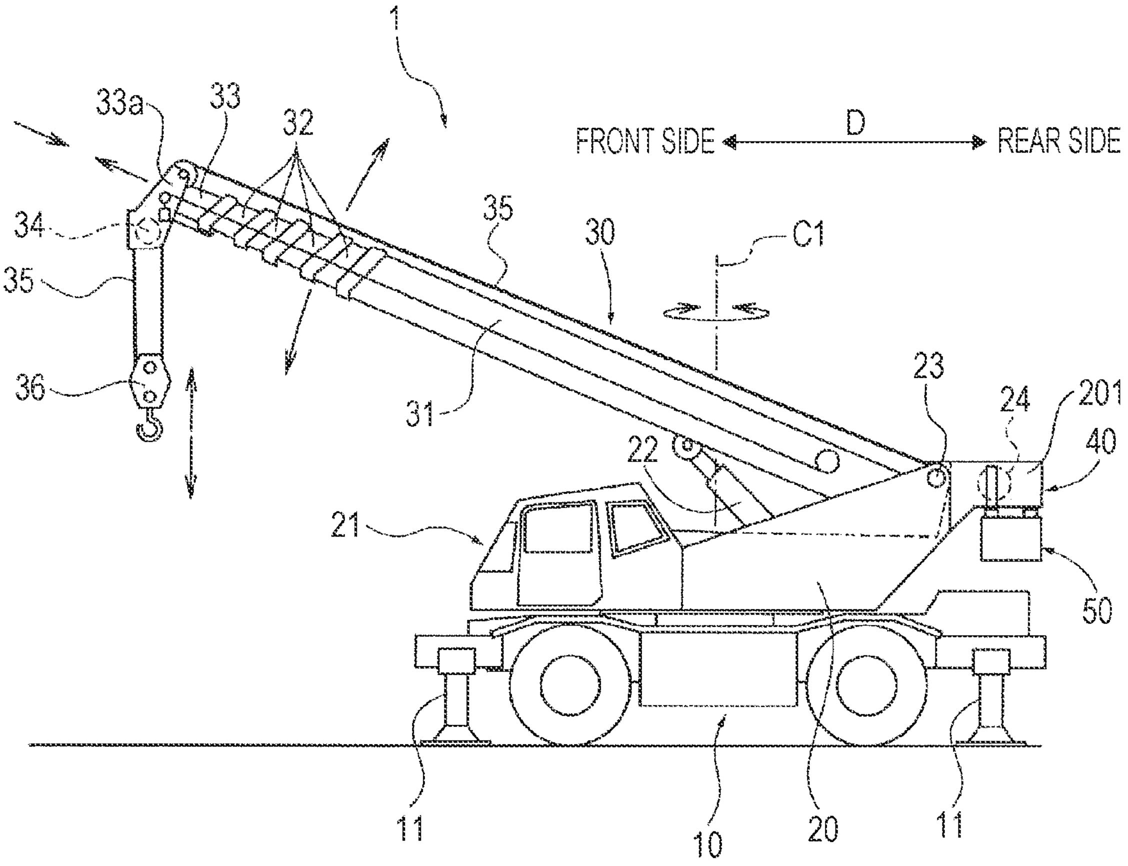
FIG. 1 is a side view illustrating a crane according to an embodiment of the present invention.

FIG. 1 is a side view illustrating the crane according to the embodiment. A configuration of the crane according to the present embodiment will be described below. The front-rear direction of the crane is defined as a front-rear direction D.

As illustrated in FIG. 1, a crane 1 includes a traveling body 10, a swivel body 20, and a boom 30.

The traveling body 10 includes an outrigger 11 and a traveling device or the like for self-traveling on a road or a work site.

At the time of work, the outrigger 11 protrudes in a horizontal direction and a vertical direction, lifts the entire vehicle body, and stabilizes the posture.

The swivel body 20 is provided above the traveling body 10 and can swivel about a vertical axis C1 with respect to the traveling body 10. The swivel body 20 includes a cabin 21. The cabin 21 includes an operation unit (for example, a steering wheel, a shift lever, an accelerator pedal, a brake pedal, and the like) for controlling travel of the traveling body 10. The cabin 21 includes an operation unit that operates the swivel body 20, the boom 30, a winch 24, and the like. The worker on board in the cabin 21 operates the operation unit to swivel the swivel body 20, raise and lower and extend and contract the boom 30, and rotate the winch 24 to perform the work.

The boom 30 includes a base end boom 31 on a base end side, an intermediate boom 32, and a tip end boom 33 on a tip end side. The intermediate boom 32 and the tip end boom 33 are telescopically housed in the base end boom 31 in sequence.

The base end boom 31 is supported by a derricking cylinder 22 provided on the swivel body 20. When the derricking cylinder 22 extends and contracts, the boom 30 rises and lowers via a root fulcrum 23, and when an extension cylinder (not illustrated) extends and contracts, the boom 30 extends and contracts.

A sheave 34 is arranged in a boom head 33*a* provided at a tip end of the tip end boom 33. A wire rope 35 for a lifting load is wound around the winch 24 provided near the base end of the boom 30 of the swivel body 20. The wire rope 35 is arranged along the boom 30 from the winch 24 to the sheave 34. The wire rope 35 wound around the sheave 34 is suspended downward in the vertical direction from the sheave 34. The tip end part of the wire rope 35 is provided with a hook 36.

A load is hung on the hook 36. When the wire rope 35 is unwound by the winch 24, the hook 36 is lowered, and when the wire rope 35 is wound up, the hook 36 rises.

A counterweight 50 is attachably/detachably fixed to a weight fixing unit 201 provided at the rear part of the swivel body 20 via a counterweight attaching/detaching means 40. The weight fixing unit 201 is a rectangular frame-shaped member.

The crane 1 configured as described above moves the cargo hung on the hook 36 to a predetermined position by unwinding and winding the wire rope 35 by the winch 24, raising and lowering and extending and contracting of the boom 30, and swivel of the swivel body 20.

(Configurations of Counterweight Attaching/Detaching Means and Counterweight)

Figure 2:
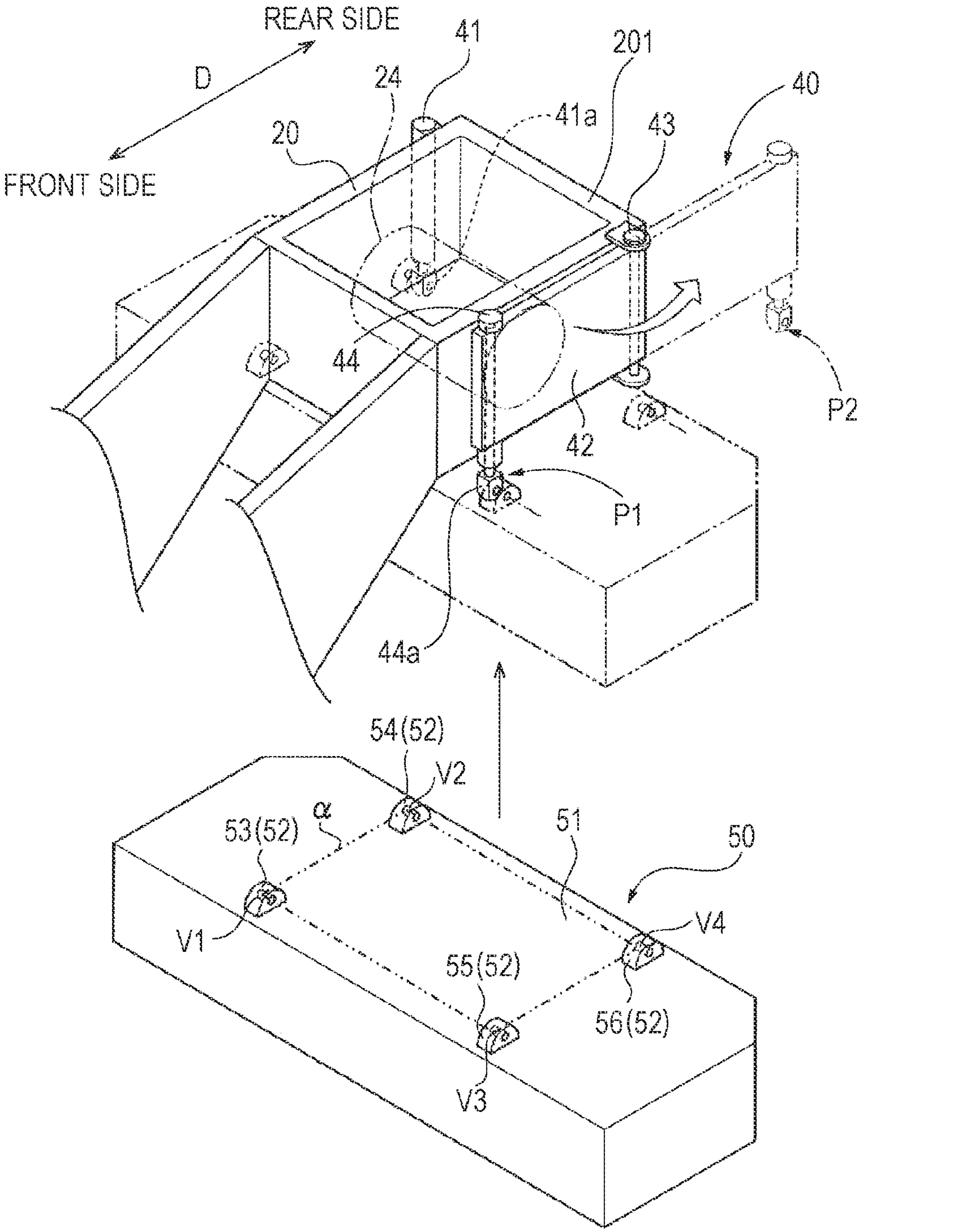
FIG. 2 is an exploded perspective view illustrating a rear part of a swivel body of the crane according to the embodiment of the present invention.
Figure 3:
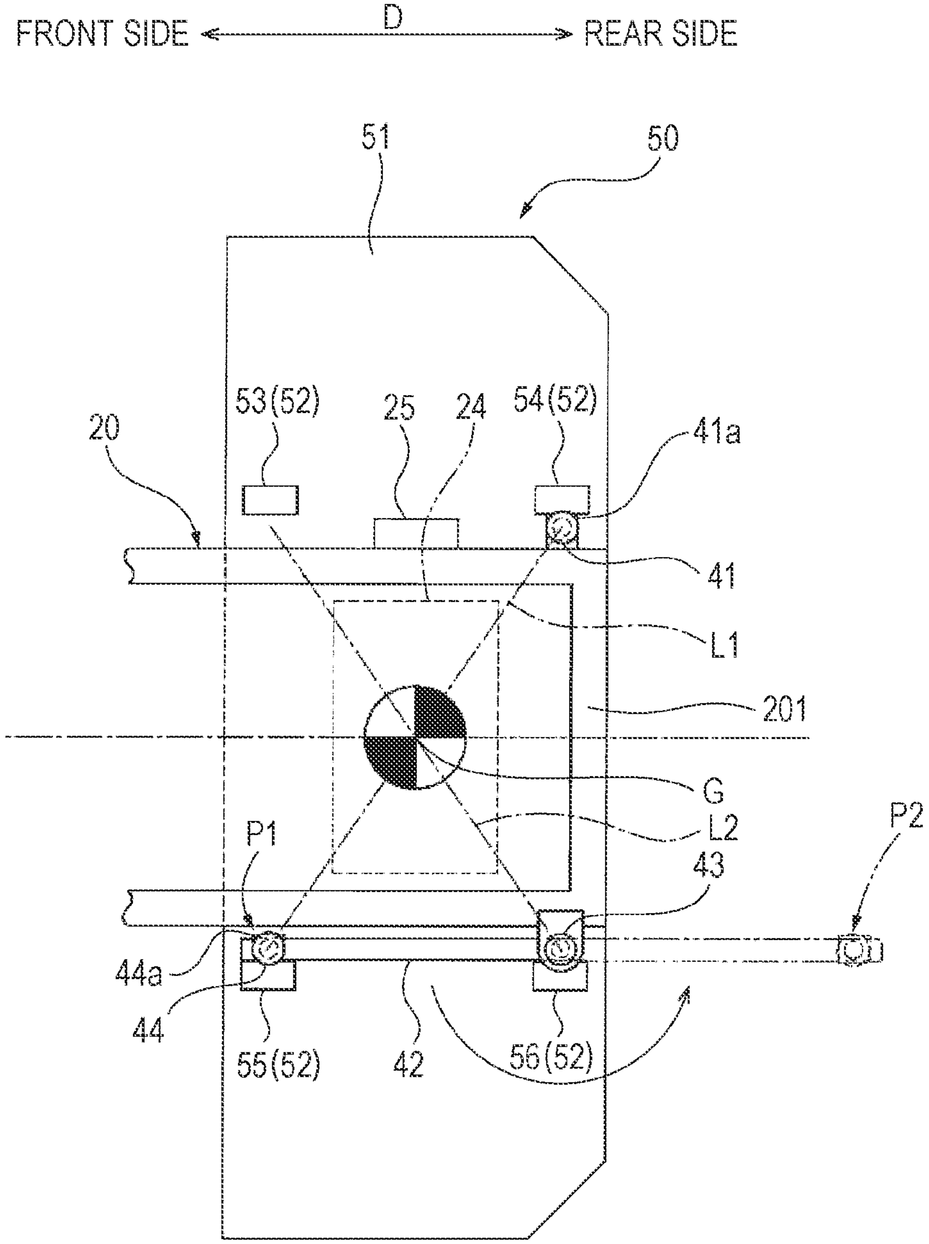
FIG. 3 is a plan view illustrating a rear part of the swivel body in a state where a second attaching/detaching cylinder of the crane according to the embodiment of the present invention is at a first position.
Figure 4:
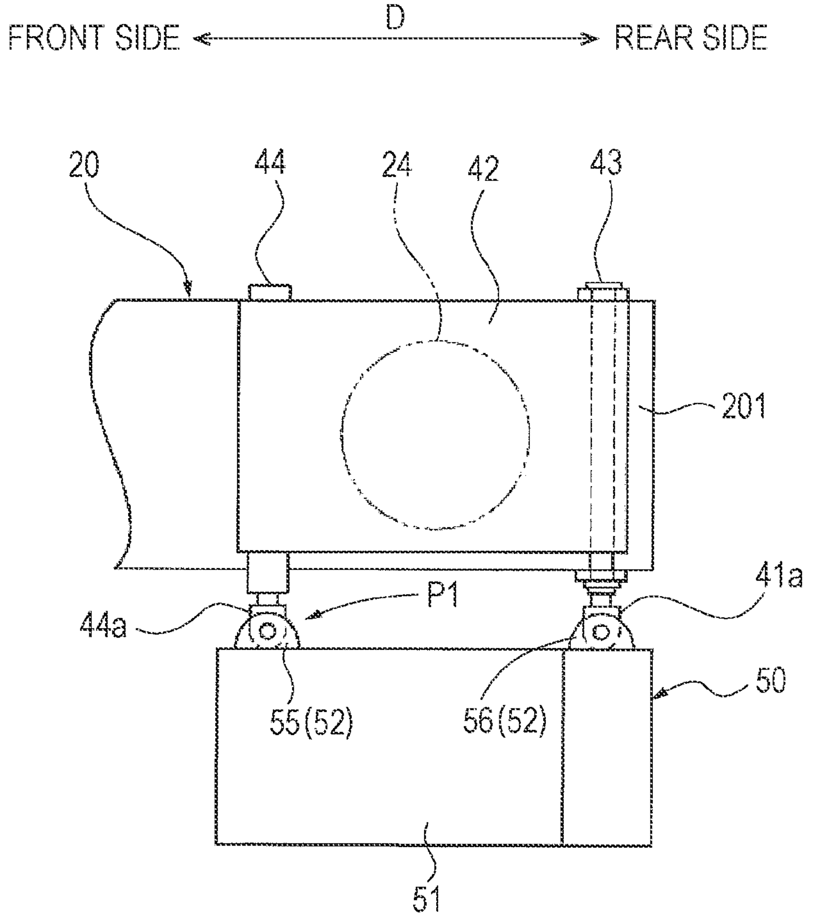
FIG. 4 is a side view illustrating a rear part of the swivel body in a state where the second attaching/detaching cylinder of the crane according to the embodiment of the present invention is at the first position.
Figure 5:
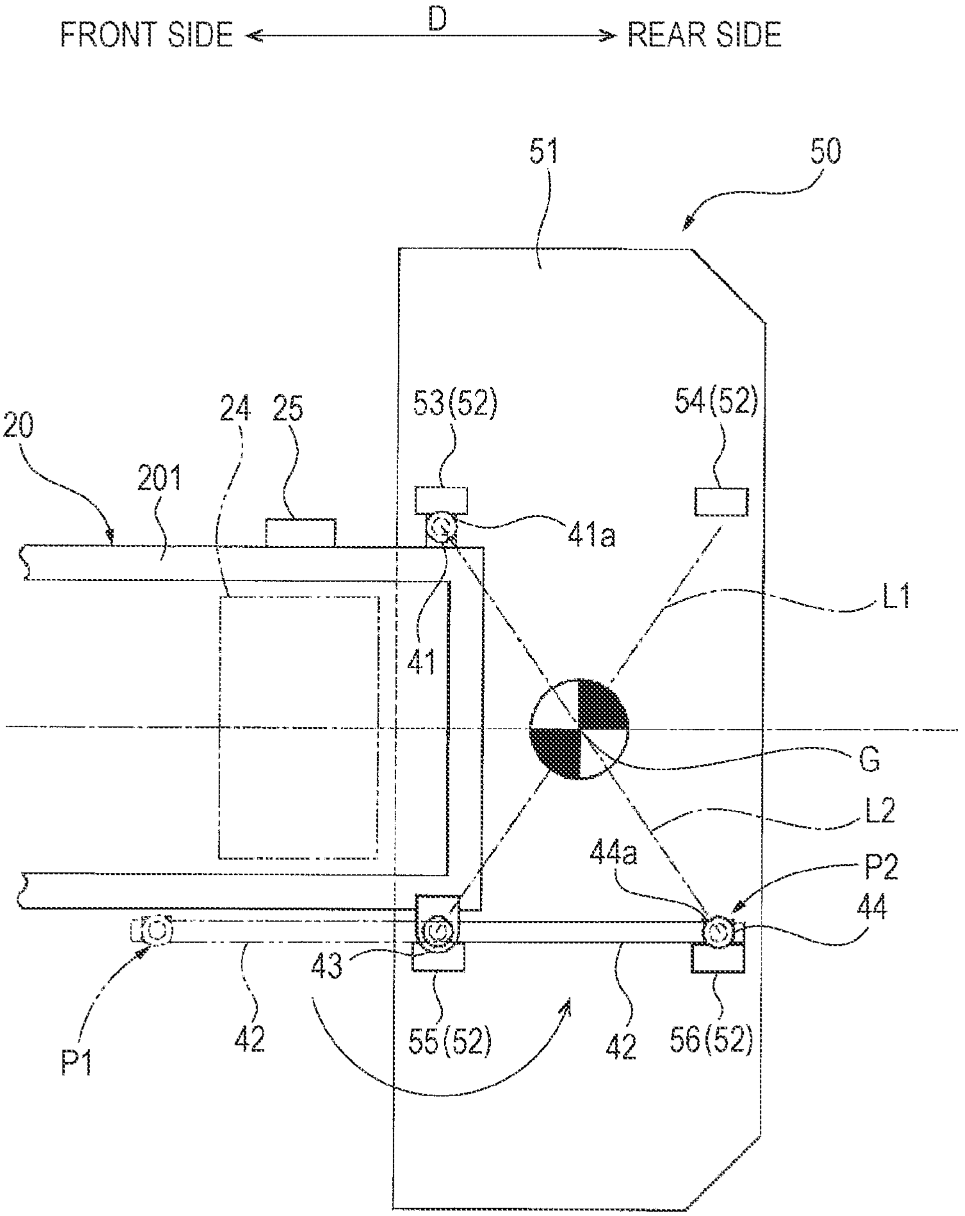
FIG. 5 is a plan view illustrating a rear part of the swivel body in a state where the second attaching/detaching cylinder of the crane according to the embodiment of the present invention is at a second position.
Figure 6:
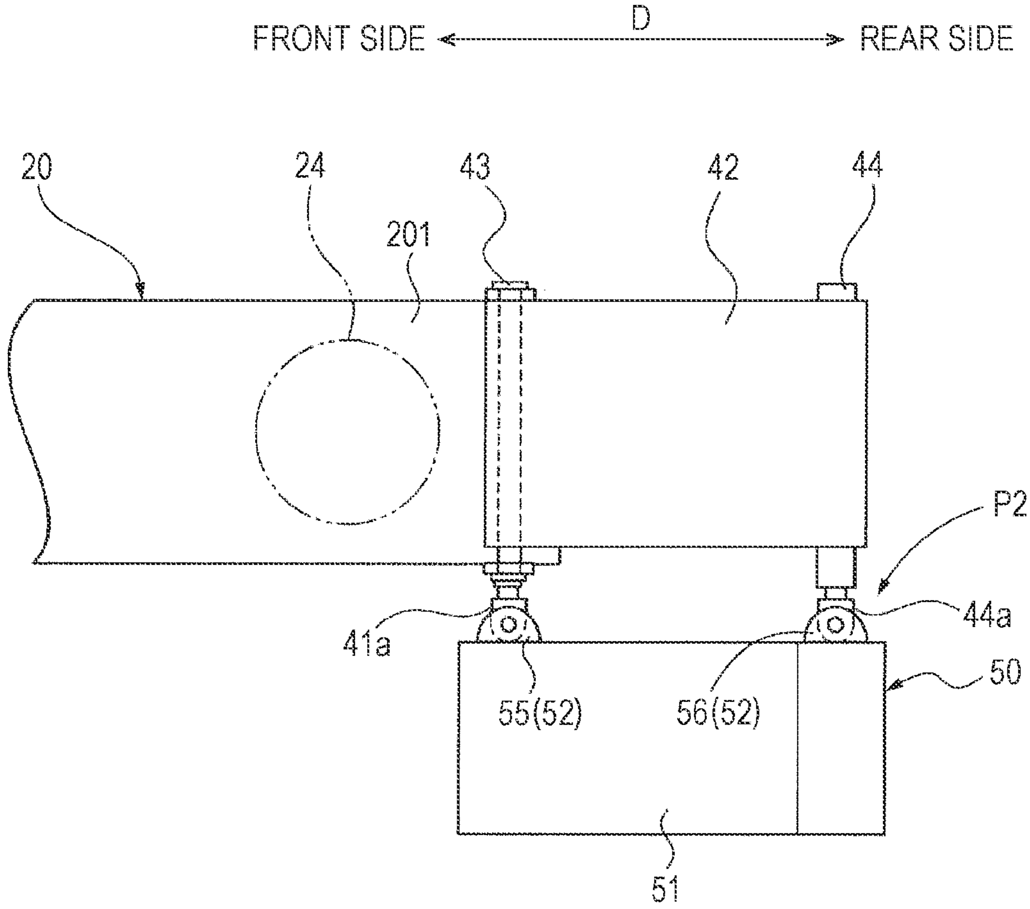
FIG. 6 is a side view illustrating a rear part of the swivel body in a state where the second attaching/detaching cylinder of the crane according to the embodiment of the present invention is at the second position.

FIG. 2 is an exploded perspective view illustrating a rear part of the swivel body. FIG. 3 is a plan view illustrating the rear part of the swivel body in a state where the second attaching/detaching cylinder is at the first position. FIG. 4 is a side view illustrating the rear part of the swivel body in a state where the second attaching/detaching cylinder is at the first position. FIG. 5 is a plan view illustrating the rear part of the swivel body in a state where the second attaching/detaching cylinder is at the second position. FIG. 6 is a side view illustrating the rear part of the swivel body in a state where the second attaching/detaching cylinder is at the second position. Hereinafter, the configurations of the counterweight attaching/detaching means 40 and the counterweight 50 will be described.

(Counterweight Attaching/Detaching Means)

As illustrated in FIG. 2, the counterweight attaching/detaching means 40 includes a first attaching/detaching cylinder 41, an arm 42, and a second attaching/detaching cylinder 44 attached to the arm 42. The counterweight attaching/detaching means 40 corresponds to an example of the fixing unit.

The first attaching/detaching cylinder 41 corresponds to an example of the engaged part and the other engaged part, and is attached to one side surface (for example, right side surface) of the weight fixing unit 201 of the swivel body 20 in a vertical posture. One side surface of the weight fixing unit 201 corresponds to an example of the first side surface of the weight fixing unit.

The first attaching/detaching cylinder 41 includes a first counterweight attaching/detaching part 41*a* at the lower end. The first counterweight attaching/detaching part 41*a* moves up and down in the vertical direction by the first attaching/detaching cylinder 41. The first counterweight attaching/detaching part 41*a* is configured to be attachable (connectable) by an attachment tool such as a pin to an attachment part 52 of the counterweight 50 described later.

The arm 42 corresponds to an example of an arm unit, and is attached to the other side surface (for example, left side surface in the traveling direction of the crane 1) of the weight fixing unit 201 of the swivel body 20 to be rotatable in the horizontal direction via a rotation center shaft 43. The other side surface of the weight fixing unit 201 corresponds to an example of a second side surface of the weight fixing unit.

The upper end and the lower end of the rotation center shaft 43 are attached to the swivel body 20. The rotation center shaft 43 is arranged at the same or substantially the same position as that of the first attaching/detaching cylinder 41 in the front-rear direction D of the crane 1. The arm 42 is configured to be able to swivel in the horizontal direction with the rotation center shaft 43 as a rotation fulcrum. The arm 42 has a plate shape. Note that the arm 42 may have a rod shape or may have a truss shape.

The arm 42 is arranged along the other side surface of the weight fixing unit 201 at a front position of the fixing unit described later. On the other hand, the arm 42 is arranged to extend in parallel with the other side surface of the weight fixing unit 201 from the rear end part toward the rear of the weight fixing unit 201 at a rear position of the fixing unit described later.

The second attaching/detaching cylinder 44 corresponds to an example of the engaged part and one engaged part, and is attached to the tip end of the arm 42 in the horizontal direction. The second attaching/detaching cylinder 44 includes a second counterweight attaching/detaching part 44*a* at the lower end. The second counterweight attaching/detaching part 44*a* moves up and down in the vertical direction by the second attaching/detaching cylinder 44. The second counterweight attaching/detaching part 44*a* is configured to be attachable (connectable) by an attachment tool such as a pin to the attachment part 52 of the counterweight 50 described later. Note that the first attaching/detaching cylinder 41 and the second attaching/detaching cylinder 44 correspond to an example of a pair of engaged parts.

The second attaching/detaching cylinder 44 is movable between a first position P1 and a second position P2 to the rear of the first position P1 by swiveling of the arm 42.

The first position P1 is a position to the front of the rotation center shaft 43. The arm 42 at the first position P1 can take a posture horizontal to the front-rear direction D.

The second position P2 is a position to the rear of the rotation center shaft 43. The second position P2 is a position where the arm 42 is horizontally swiveled by 180 degrees from the first position P1, for example. That is, the second position P2 is positioned to the rear of the first position P1.

In the counterweight attaching/detaching means 40, the state in which the second attaching/detaching cylinder 44 is positioned at the first position P1 corresponds to an example of the first state of the fixing unit and the front position. In the counterweight attaching/detaching means 40, the state in which the second attaching/detaching cylinder 44 is positioned at the second position P2 corresponds to an example of the second state of the fixing unit and the rear position.

The first state (front position) of the fixing unit may be regarded as a state in which the second attaching/detaching cylinder 44 is positioned in front relative to the first attaching/detaching cylinder 41 and a state in which the counterweight 50 described later can be fixed by the fixing unit. The second state (rear position) of the fixing unit may be regarded as a state in which the second attaching/detaching cylinder 44 is positioned to rear relative to the first attaching/detaching cylinder 41 and a state in which the counterweight 50 described later can be fixed by the fixing unit.

In the case of the present embodiment, the engaged part of the fixing unit is arranged at a position corresponding to the engaging part of the counterweight in a state where the fixing unit is positioned at each of the front position and the rear position. In this state, the engaged part of the fixing unit is connected to the engaging part, whereby the fixing unit and the counterweight are linked.

Specifically, in a state where the second attaching/detaching cylinder 44 is positioned at the first position P1 (the first state of the fixing unit and the front position), the first attaching/detaching cylinder 41 and the second attaching/detaching cylinder 44 of the counterweight attaching/detaching means 40 are arranged at positions corresponding to a first rear side attachment part 54 and a second front side attachment part 55 of the counterweight 50 described later.

On the other hand, in a state where the second attaching/detaching cylinder 44 is positioned at the second position P2 (the second state of the fixing unit and the rear position of the fixing unit), the first attaching/detaching cylinder 41 and the second attaching/detaching cylinder 44 of the counterweight attaching/detaching means 40 are arranged at positions corresponding to a first front side attachment part 53 and a second rear side attachment part 56 of the counterweight 50 described later.

In a state where the second attaching/detaching cylinder 44 is positioned at a position other than the first position P1 and the second position P2 (in other words, other than the front position and the rear position), the first attaching/detaching cylinder 41 and the second attaching/detaching cylinder 44 of the counterweight attaching/detaching means 40 are not arranged at positions corresponding to the attachment parts 53 to 56 of the counterweight 50. That is, in a state where the second attaching/detaching cylinder 44 is positioned at a position other than the first position P1 and the second position P2 (in other words, other than the front position and the rear position), the counterweight attaching/detaching means 40 and the counterweight 50 cannot be linked.

(Counterweight)

The counterweight 50 includes a counterweight main body 51 and an attachment part 52.

The attachment part 52 corresponds to an example of the engaging part, and is provided on the upper surface of the counterweight main body 51. The attachment part 52 includes the first front side attachment part 53 attachable to the first counterweight attaching/detaching part 41*a* of the first attaching/detaching cylinder 41, the first rear side attachment part 54 attachable to the first counterweight attaching/detaching part 41*a* of the first attaching/detaching cylinder 41, the second front side attachment part 55 attachable to the second counterweight attaching/detaching part 44*a* of the second attaching/detaching cylinder 44, and the second rear side attachment part 56 attachable to the second counterweight attaching/detaching part 44*a* of the second attaching/detaching cylinder 44. Each of such attachment parts 53 to 56 corresponds to an example of the engaging part.

The attachment parts 53 to 56 are arranged at positions corresponding to the vertices of an imaginary rectangle a (see FIG. 2) on the upper surface of the counterweight 50. The four sides of the imaginary rectangle a are parallel to the respective four sides of the upper surface of the counterweight 50.

The first front side attachment part 53 corresponds to an example of a first front side engaging part, and is provided at a position corresponding to a first vertex V1 of the imaginary rectangle a on the upper surface of the counterweight 50. The first rear side attachment part 54 corresponds to an example of a first rear side engaging part, and is provided at a position corresponding to a second vertex V2 of the imaginary rectangle a on the upper surface of the counterweight 50.

The second front side attachment part 55 corresponds to an example of a second front side engaging part, and is provided at a position corresponding to a third vertex V3 of the imaginary rectangle a on the upper surface of the counterweight 50. The second rear side attachment part 56 corresponds to an example of a second rear side engaging part, and is provided at a position corresponding to a fourth vertex V4 of the imaginary rectangle a on the upper surface of the counterweight 50.

Specifically, the first front side attachment part 53 is provided at a part near the front end on the upper surface of the counterweight main body 51 in the front-rear direction D. The first rear side attachment part 54 is provided at a part near the rear end on the upper surface of the counterweight main body 51 in the front-rear direction D. The second front side attachment part 55 is provided at a part near the front end on the upper surface of the counterweight main body 51 in the front-rear direction D. The second rear side attachment part 56 is provided at a part near the rear end on the upper surface of the counterweight main body 51 in the front-rear direction D.

The first rear side attachment part 54 is provided to the rear relative to the first front side attachment part 53. The second rear side attachment part 56 is provided to the rear relative to the second front side attachment part 55. The first front side attachment part 53 and the first rear side attachment part 54 are provided at the same or substantially the same position in the left-right direction. The second front side attachment part 55 and the second rear side attachment part 56 are provided at the same or substantially the same position in the left-right direction.

The first front side attachment part 53 and the second front side attachment part 55 are provided at the same or substantially the same position in the front-rear direction D. The first rear side attachment part 54 and the second rear side attachment part 56 are provided at the same or substantially the same position in the front-rear direction D.

As shown in FIG. 3, in plan view, the first rear side attachment part 54 and the second front side attachment part 55 are arranged on a line L1 passing through a center of gravity G of the counterweight 50. Note that the plan view means that the swivel body 20 is viewed in a plan view from above.

As shown in FIG. 5, in plan view, the first front side attachment part 53 and the second rear side attachment part 56 are arranged on a line L2 passing through the center of gravity G of the counterweight 50.

As illustrated in FIGS. 3 and 5, a driving component 25 that drives the winch 24 for the wire rope 35 is attached to one side surface of the weight fixing unit 201 of the swivel body 20 attached with the first attaching/detaching cylinder 41. The driving component 25 can be, for example, a driving motor that drives the winch 24 or a detection device that detects rotation of the winch 24.

In the case of the crane 1 configured as described above, in a state where the second attaching/detaching cylinder 44 is positioned at the first position P1 (that is, the first state of the fixing unit and the front position), the first counterweight attaching/detaching part 41*a* of the first attaching/detaching cylinder 41 is attached to the first rear side attachment part 54 of the counterweight 50, and the second counterweight attaching/detaching part 44*a* of the second attaching/detaching cylinder 44 is attached to the second front side attachment part 55 of the counterweight 50. As a result, the counterweight 50 is attached (fixed) to a relatively front side position (also referred to as first position) with respect to the weight fixing unit 201 of the swivel body 20.

On the other hand, as illustrated in FIGS. 5 and 6, in the case of the crane 1, in a state where the second attaching/detaching cylinder 44 is positioned at the second position P2 (that is, the second state of the fixing unit and the rear position), the first counterweight attaching/detaching part 41*a* of the first attaching/detaching cylinder 41 is attached to the first front side attachment part 53 of the counterweight 50, and the second counterweight attaching/detaching part 44*a* of the second attaching/detaching cylinder 44 is attached to the second rear side attachment part 56 of the counterweight 50. As a result, the counterweight 50 is attached (fixed) to a position (also referred to as second position) to the rear relative to the position (first position) attached at the first position P1 with respect to the weight fixing unit 201 of the swivel body 20. In the case of the present embodiment, the counterweight 50 is fixed in a state of being suspended below the counterweight attaching/detaching means 40 by the counterweight attaching/detaching means 40.

(Action of Crane)

The action of the crane 1 according to the present embodiment will be described below.

The crane 1 according to the present embodiment includes: the first attaching/detaching cylinder 41 that is attached to one side surface of the weight fixing unit 201 of the swivel body 20 and to which the counterweight 50 can be attached/detached; the arm 42 that is attached to the other side surface of the weight fixing unit 201 of the swivel body 20 so as to be able to swivel in the horizontal direction; and the second attaching/detaching cylinder 44 that is attached to the arm 42 and to which the counterweight 50 can be attached/detached, and the second attaching/detaching cylinder 44 is configured to be movable between the first position P1 and the second position P2 to the rear relative to the first position P1 by swiveling of the arm 42.

As a result, the first attaching/detaching cylinder 41 and the second attaching/detaching cylinder 44 at the first position P1 can support the counterweight 50 in a state of being arranged on the front. The first attaching/detaching cylinder 41 and the second attaching/detaching cylinder 44 at the second position P2 can support the counterweight 50 in a state of being arranged on the rear. Therefore, the fixing position of the counterweight 50 can be changed front and rear with a simple configuration.

Since one side surface of the weight fixing unit 201 of the swivel body 20 is not attached with the arm 42 swiveling in the horizontal direction, components such as the driving component 25 can be attached to one side surface of the weight fixing unit 201 of the swivel body 20. Therefore, the degree of freedom in designing one side surface of the swivel body 20 can be increased.

In the case of the crane 1 according to the present embodiment, the first rear side attachment part 54 that is provided on the rear side of the counterweight 50 and can be attached to the first attaching/detaching cylinder 41 and the second front side attachment part 55 that is provided on the front side of the counterweight 50 and can be attached to the second attaching/detaching cylinder 44 are arranged on the line L1 passing through the center of gravity G of the counterweight 50 in plan view.

In other words, in plan view, the center of gravity of the counterweight 50 is positioned on the diagonal line of the imaginary rectangle a (see FIG. 2) connecting the second vertex V2 and the third vertex V3 corresponding to the first rear side attachment part 54 and the second front side attachment part 55 among the vertices of the imaginary rectangle a. The line L1 coincides with the diagonal line connecting the second vertex V2 and the third vertex V3.

The first front side attachment part 53 that is provided on the front side of the counterweight 50 and can be attached to the first attaching/detaching cylinder 41 and the second rear side attachment part 56 that is provided on the rear side of the counterweight 50 and can be attached to the second attaching/detaching cylinder 44 are arranged on the line L2 passing through the center of gravity G in plan view.

In other words, in plan view, the center of gravity of the counterweight 50 is positioned on the diagonal line of the imaginary rectangle a (see FIG. 2) connecting the first vertex V1 and the fourth vertex V4 corresponding to the first front side attachment part 53 and the second rear side attachment part 56 among the vertices of the imaginary rectangle a. The line L2 coincides with the diagonal line connecting the first vertex V1 and the fourth vertex V4.

Due to this, the first attaching/detaching cylinder 41 and the second attaching/detaching cylinder 44 at the first position P1 are arranged on the line L1 passing through the center of gravity G of the counterweight 50. The first attaching/detaching cylinder 41 and the second attaching/detaching cylinder 44 at the second position P2 are arranged on the line L2 passing through the center of gravity G of the counterweight 50. That is, regardless of whether the attachment position of the counterweight 50 is on the front side or the rear side, the attachment position of the counterweight 50 can be arranged on the lines L1 and L2 passing through the center of gravity G of the counterweight 50. Therefore, the counterweight attaching/detaching means 40 can stably support the counterweight 50 regardless of whether the attachment position of the counterweight 50 is on the front side or the rear side.

In the crane 1 of the present embodiment, the first attaching/detaching cylinder 41 and the rotation center shaft 43 of the arm 42 are arranged at the same or substantially the same position in the front-rear direction D of the crane 1.

Due to this, regardless of whether the attachment position of the counterweight 50 is on the front side or the rear side, the attachment position of the counterweight 50 is positioned on the lines L1 and L2 passing through the center of gravity G of the counterweight 50. Therefore, the counterweight attaching/detaching means 40 can stably support the counterweight 50 regardless of whether the attachment position of the counterweight 50 is on the front side or the rear side.

When attaching the driving component 25 to the side surface of the swivel body 20 provided with the arm 42, it is necessary to attach the driving component 25 to a position avoiding the swivel track of the arm 42. Therefore, it is necessary to lengthen the swivel body 20 in the front-rear direction D of the crane 1.

In the crane 1 according to the present embodiment, one side surface of the swivel body 20 attached with the first attaching/detaching cylinder 41 is attached with the driving component 25 that drives the winch 24 for the wire rope 35.

This makes it possible to arrange the driving component 25 without avoiding the swivel track of the arm 42. As a result, the crane 1 can be downsized.

The embodiment of the present invention has been described above. However, the specific configuration is not limited to the configuration of the present embodiment, and design changes, additions, and the like are allowed without departing from the gist of the invention according to each claim of the claims.

In the present embodiment, an example in which the arm 42 is provided on the left side surface of the swivel body 20 in the traveling direction of the crane 1 has been described. However, the arm may be provided on the right side surface of the swivel body. The mechanism (moving mechanism) that moves the second attaching/detaching cylinder between the first position and the second position is not limited to the structure of the arm 42 described above.

In the present embodiment, an example in which the second attaching/detaching cylinder 44 is provided at the tip end of the arm 42 in the horizontal direction has been described. However, the second attaching/detaching cylinder 44 may be attached to a place other than the tip end of the arm.

In the present embodiment, an example in which the attachment part 52 of the counterweight 50 is provided on the upper surface of the counterweight main body 51 has been described. However, the position of the attachment part of the counterweight is not limited to that in this aspect, and may be provided, for example, on the lower surface or the side surface of the counterweight main body.

In the present embodiment, an example in which four attachment parts 52 of the counterweight 50 are provided has been described. However, six or more attachment parts of the counterweight may be provided.

In the present embodiment, the counterweight 50 is linked so as to be suspended below the counterweight attaching/detaching means 40 by the counterweight attaching/detaching means 40. However, the counterweight 50 may be fixed above the counterweight attaching/detaching means 40.

In the present embodiment, the second attaching/detaching cylinder 44 moves between the first position P1 and the second position P2 by swivel of the arm 42. However, the mechanism for moving the second attaching/detaching cylinder 44 is not limited to the configuration of the arm 42 in the present embodiment. For example, the mechanism for moving the second attaching/detaching cylinder 44 may have a configuration in which a member such as the arm 42 is provided on the weight fixing unit 201 of the swivel body 20 so as to be slidable in the front-rear direction.

The entire disclosure of the description, drawings, and abstract included in Japanese Patent Application No. 2020-25070 filed on Feb. 18, 2020 is incorporated herein by reference.

INDUSTRIAL APPLICABILITY

The present invention can be suitably applied to various cranes on which a counterweight can be mounted, for example.

REFERENCE SIGNS LIST

1 crane
10 traveling body
11 outrigger
20 swivel body
201 weight fixing unit
21 cabin
22 derricking cylinder
23 root fulcrum
24 winch
25 driving component
30 boom
31 base end boom
32 intermediate boom
33 tip end boom
33*a* boom head
34 sheave
35 wire rope
36 hook
40 counterweight attaching/detaching means
41 first attaching/detaching cylinder
41*a* first counterweight attaching/detaching part
42 arm
43 rotation center shaft
44 second attaching/detaching cylinder
44*a* second counterweight attaching/detaching part
50 counterweight
51 counterweight main body
52 attachment part
53 first front side attachment part
54 first rear side attachment part
55 second front side attachment part
56 second rear side attachment part
G center of gravity
P1 first position
P2 second position

The invention claimed is:

1. A crane, comprising:
a counterweight that includes an engaging part;
a swivel body that is configured to be capable of swiveling; and
a fixing unit that is provided on the swivel body, includes a pair of engaged parts that are connectable with the engaging part, and is capable of selectively adopting a front position and a rear position, wherein
in each of the front position and the rear position, the fixing unit and the counterweight are linked by the pair of engaged parts being arranged in a position corresponding to that of the engaging part and being connected to the engaging part,
one engaged part of the pair of engaged parts is configured to be movable in a front-rear direction with respect to an other engaged part of the pair of engaged parts, and
the pair of engaged parts are arranged to be shifted from each other in the front-rear direction and a left-right direction at each of the front position and the rear position.

2. The crane according to claim 1, wherein the counterweight includes the engaging part on an upper surface, and is linked in a state of being suspended from the fixing unit.

3. The crane according to claim 1, wherein the pair of engaged parts are arranged so as to be positioned on a same straight line as a center of gravity of the counterweight in a planar view at each of the front position and the rear position.

4. The crane according to claim 1, wherein a first side surface of a weight fixing unit provided at a rear end part of the swivel body is attached with a driving component that drives a winch for unwinding or winding a wire rope.

5. A crane, comprising:
a counterweight that includes an engaging part;
a swivel body that is configured to be capable of swiveling; and
a fixing unit that is provided on the swivel body, includes a pair of engaged parts that are connectable with the engaging part, and is capable of selectively adopting a front position and a rear position, wherein
in each of the front position and the rear position, the fixing unit and the counterweight are linked by the pair of engaged parts being arranged in a position corresponding to that of the engaging part and being connected to the engaging part,
one engaged part of the pair of engaged parts is configured to be movable in a front-rear direction with respect to an other engaged part of the pair of engaged parts, and
the fixing unit includes an arm unit that is rotatably provided on the swivel body and supports the one engaged part, and is arranged at either the front position or the rear position based on rotation of the arm unit, and the other engaged part is not supported by any arm unit provided on the swivel body.

6. The crane according to claim 5, wherein the counterweight includes the engaging part on an upper surface, and is linked in a state of being suspended from the fixing unit.

7. The crane according to claim 5, wherein the pair of engaged parts are arranged to be shifted from each other in the front-rear direction and a left-right direction at the front position and the rear position.

8. The crane according to claim 7, wherein the pair of engaged parts are arranged so as to be positioned on a same straight line as a center of gravity of the counterweight in a planar view at each of the front position and the rear position.

9. The crane according to claim 5, wherein
the other engaged part is provided on a first side surface in a left-right direction of a weight fixing unit provided at a rear end part of the swivel body, and
the arm unit is rotatably provided on a second side surface in the left-right direction of the weight fixing unit.

10. The crane according to claim 9, wherein the arm unit is arranged along the second side surface at the front position, and is arranged at the rear position to extend rearward from a rear end part of the weight fixing unit in a state of being parallel to the second side surface.

11. The crane according to claim 5, wherein a rotation center of the arm unit and the other engaged part are provided at a same position or substantially a same position in the front-rear direction.

12. The crane according to claim 5, wherein
the counterweight includes, as the engaging part,
a first front side engaging part,
a first rear side engaging part that is provided at a same position as the first front side engaging part in a left-right direction and at a position to rear relative to the first front side engaging part,
a second front side engaging part that is provided at a same position as the first front side engaging part in the front-rear direction and at a position shifted from the first front side engaging part in the left-right direction, and
a second rear side engaging part that is provided at a same position as the second front side engaging part in the left-right direction and at a position to rear relative to the second front side engaging part,
the first rear side engaging part is fixed to the other engaged part at the front position, and the second front side engaging part is fixed to the one engaged part at the front position, and
the first front side engaging part is fixed to the other engaged part at the rear position, and the second rear side engaging part is fixed to the one engaged part at the rear position.

13. The crane according to claim 5, wherein a first side surface of a weight fixing unit provided at a rear end part of the swivel body is attached with a driving component that drives a winch for unwinding or winding a wire rope.

14. A crane, comprising:
a counterweight that includes an engaging part;
a swivel body that is configured to be capable of swiveling; and
a fixing unit that is provided on the swivel body, includes a pair of engaged parts that are connectable with the engaging part, and is capable of selectively adopting a front position and a rear position, wherein
in each of the front position and the rear position, the fixing unit and the counterweight are linked by the pair of engaged parts being arranged in a position corresponding to that of the engaging part and being connected to the engaging part,
one engaged part of the pair of engaged parts is configured to be movable in a front-rear direction with respect to an other engaged part of the pair of engaged parts,
the counterweight includes, as the engaging part,
a first front side engaging part,
a first rear side engaging part that is provided at a same position as the first front side engaging part in a left-right direction and at a position to rear relative to the first front side engaging part,
a second front side engaging part provided at a same position as the first front side engaging part in the front-rear direction and at a position shifted from the first front side engaging part in the left-right direction, and
a second rear side engaging part provided at a same position as the second front side engaging part in the left-right direction and at a position to rear relative to the second front side engaging part,
the first rear side engaging part is fixed to the other engaged part at the front position, and the second front side engaging part is fixed to the one engaged part at the front position, and
the first front side engaging part is fixed to the other engaged part at the rear position, and the second rear side engaging part is fixed to the one engaged part at the rear position.

15. The crane according to claim 14, wherein the counterweight includes the engaging part on an upper surface, and is linked in a state of being suspended from the fixing unit.

16. The crane according to claim 14, wherein the pair of engaged parts are arranged to be shifted from each other in the front-rear direction and the left-right direction at the front position and the rear position.

17. The crane according to claim 16, wherein the pair of engaged parts are arranged so as to be positioned on a same straight line as a center of gravity of the counterweight in a planar view at each of the front position and the rear position.

18. The crane according to claim 14, wherein a first side surface of a weight fixing unit provided at a rear end part of the swivel body is attached with a driving component that drives a winch for unwinding or winding a wire rope.

* * * * *